Aug. 20, 1935.  A. J. FIHE  2,012,186
AUTOMATIC STARTING GATE
Filed Dec. 30, 1932
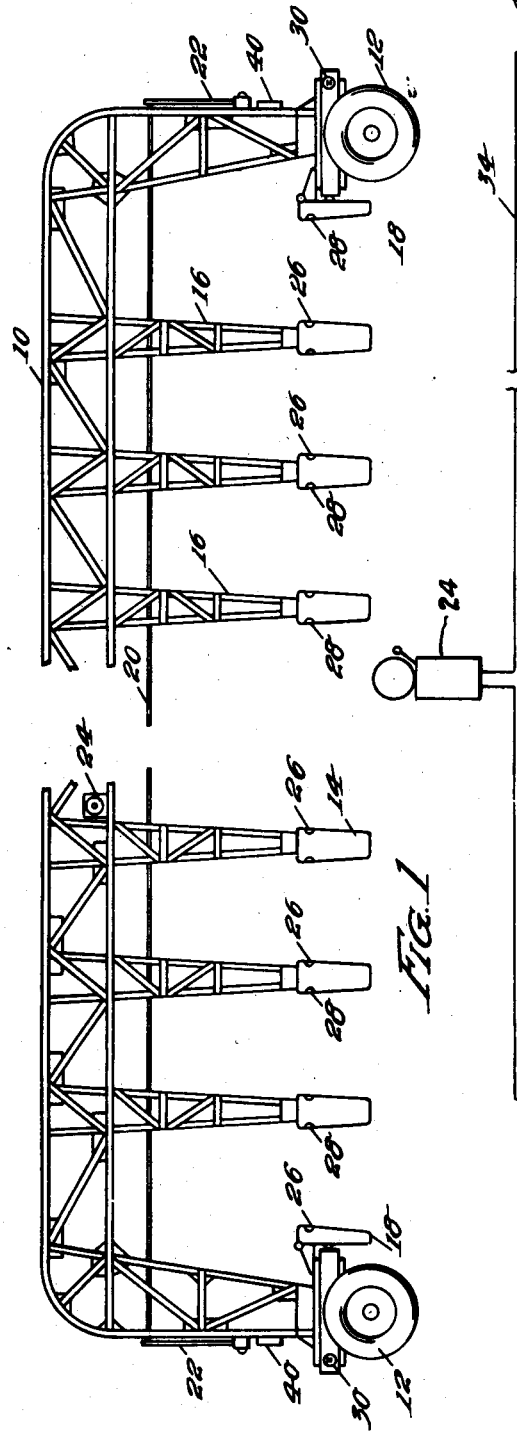
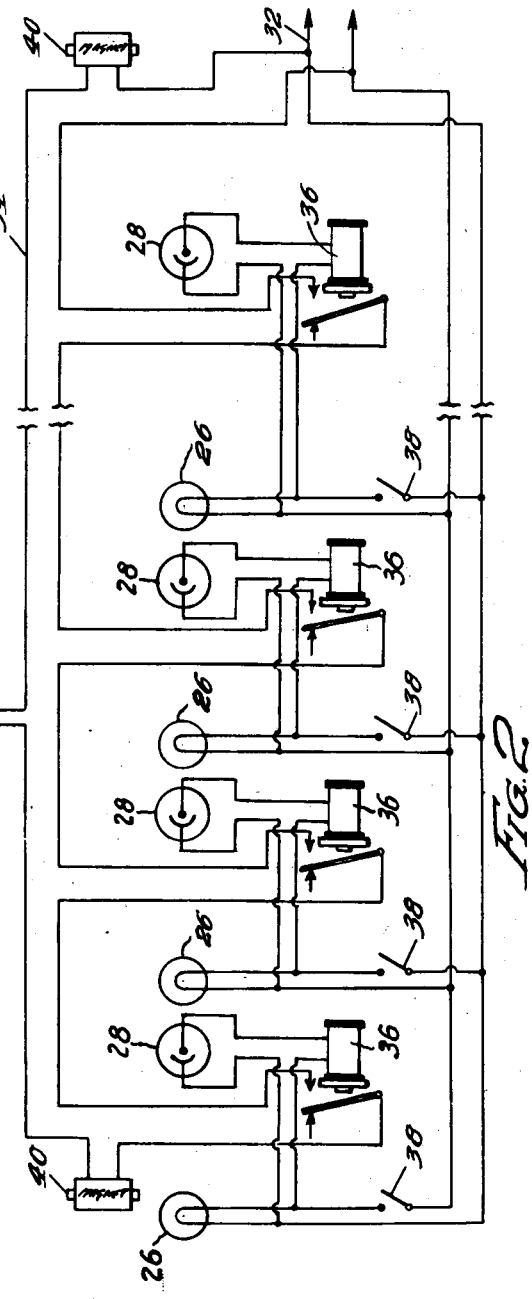
INVENTOR:
Albert J. Fihe Patented Aug. 20, 1935

2,012,186

UNITED STATES PATENT OFFICE 2,012,186

AUTOMATIC STARTING GATE

Albert J. Fihe, Chicago, Ill., assignor to Bahr Starting Gate Corporation, Chicago, Ill., a corporation of Illinois Application December 30, 1932, Serial No. 649,554

7 Claims. (Cl. 119—15.5)

This invention relates to an improved automatic starting gate, particularly for race horses or the like, and has for one of its principal objects the provision of means for starting a race which will be automatically operated as soon as all the horses or other animals are in starting position.

One of the important objects of this invention is to provide an automatic starting gate for use on race tracks wherein the barrier and other starting means are automatically controlled and operated when the racers are in starting position and which at the same time prevents a deliberate "beating of the barrier" by the rush of one or more animals through the gate at the last moment.

Still another and further important object of the invention resides in the provision of a starting gate, having its stalls equipped with sources of light and corresponding photo-electric cells, whereby the barrier will be sprung and an alarm automatically operated as soon as all the horses are in starting position and have been settled in that position.

Other and further important objects of the invention will be apparent from the disclosures in the accompanying drawing and following specification.

The invention, in a preferred form, is shown in the drawing and hereinafter more fully described.

In the drawing:

Figure 1 is an elevational view of the improved automatic starting gate of this invention, illustrating the important details.

Figure 2 is a diagrammatic view of the electrical wiring and other connections for the automatic starting gate illustrated in Figure 1.

As shown in the drawing:

The reference numeral 10 indicates generally the overhead structure of a modern starting gate for race horses or the like, this structure being mounted on wheels 12 for the purpose of transportation and having a plurality of depending stall partitions 14 supported from the overhead structure by means of the members 16. The end stall partitions 18 are pivoted to allow of a better and more free turning of the operating wheels 12.

The usual barrier, tape or the like 20 is fixed on the starting gate, this being supported by pivoted elements 22 positioned at each end of the gate and adapted to be automatically sprung into horse releasing position when all the horses are in proper starting relationship to the gate and to each other. A starting bell 24 is provided which is automatically rung when the barrier is sprung, thereby giving warning to the spectators and also to the horses and jockeys that the race has been officially started.

In each of the stall members 14 is positioned a source of light 26 and a photo-electric cell 28, the light source 26 being preferably of such construction and form that a beam of light therefrom plays directly upon the photo-electric cell 28 in the face of the adjacent stall. It will be noted that there is a source of light 26 in one of the pivoted stall partitions and a corresponding photo-electric cell 28 in the other pivoted stall partition, these operating in conjunction with the adjacent respective sources of light and photo-electric cells.

When it is desired to operate the device, an electrical connection to a suitable source of current supply is made by means of a plug or the like 30 in either end of the gate, which plug is connected to the usual current carrying wires 32 and 34 built into the gate.

The wires 34 lead to the light sources 26 as best shown in Figure 2, and beams from these light sources play directly around the adjacent photo-electric cells 28, activating the same and allowing control of suitable magnets or other elements situated in the relay housings 36.

These housings control slow acting relays which can be adjusted for a suitable time period affording a desired delay of approximately one second or thereabouts, so that in the event of a horse coming through its stall and cutting off the source of light to the photo-electric cell, the barrier is not immediately sprung, but the horse is held in position for a desired period of time, as, for example, approximately one second, so as to compel him to make a complete stop, and thereby prevent any deliberate or accidental rushing of the barrier. These slow acting relays may be of any desired type such as those wherein a copper ring is mounted around the armature or solenoid to delay the action of same for a certain predetermined time.

The connections from the photo-electric cells to the wires 34 are such that when all the light sources have been cut off by the presence of horses in the stalls, the barrier is automatically sprung and the alarm bell 24 is operated, thereby starting the horses. In the event that there are not sufficient horses to fill the gate, those stalls not occupied are preliminarily put out of operation by means of switches or the like 38.

When all the relays have been operated by the presence of horses in the stalls, the current through the wires 34 is completed by the action of the magnets or other devices in the relays, and magnets 40 are thereby activated which magnets are connected with trips mounted in conjunction with the barrier supports 22 accordingly actually said trips and thereby allowing the barrier to be sprung.

At the same time, a bell 24 is operated, thereby giving the signal that the horses are off. However, if it should happen that one of the horses should back out of his stall, even after they have all been preliminarily in position, but before the relays have had time to operate, the corresponding photo-electric cell is again activated on account of the access of the juxtaposed light beam thereto, and the barrier is not sprung, thereby holding the horses until all are again and have been for the required length of time in proper starting position.

It will be seen that herein is provided an automatic starting gate for race tracks or the like wherein the horses will be positively and definitely started as soon as they are all in proper position and without any outside human intervention whatever. This eliminates the necessity of starters and assistant starters, and the race-going public will evidently be considerably impressed by the fact that the starting of the horses is so accomplished, thereby greatly lessening and practically eliminating the chance of false starts or any possibilities of favor being shown to a selected horse in a race.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. An automatic starting gate, including a plurality of stalls, a light source and a photo-electric cell in each stall, and means connected with all of said photo-electric cells for automatically starting the race when the racers are all in position, and have been in such position for a predetermined length of time.

2. An automatic starting gate, including a plurality of stalls, a light source and a photo-electric cell in each stall, and means connected with all of said photo-electric cells for automatically starting the race when the racers are all in position, and have been in such position for a predetermined length of time, the said last-named means including a slow-acting relay in conjunction with each photo-electric cell.

3. A race starting gate, including a plurality of stalls for racers, a light source, and a photo-electric cell in each stall, the photo-electric cell adapted to release the barrier of the gate upon the presence of a horse in the stall, and the corresponding presence of the remaining horses in adjacent stalls, all of said photo-electric cells operating only when all the horses are in proper position, and means for delaying the horses in proper position for a predetermined length of time.

4. A race starting gate, including a plurality of stalls for racers, a light source, and a photo-electric cell in each stall, the photo-electric cell adapted to release the barrier of the gate upon the presence of a horse in the stall, and the corresponding presence of the remaining horses in adjacent stalls, all of said photo-electric cells operating only when all the horses are in proper position, and means for delaying the horses in proper position for a predetermined length of time, said means including slow-acting relays mounted in conjunction with the photo-electric cells.

5. A race starting gate, including a plurality of stalls for racers, a light source, and a photo-electric cell in each stall, the photo-electric cell adapted to release the barrier of the gate upon the presence of a horse in the stall, and the corresponding presence of the remaining horses in adjacent stalls, all of said photo-electric cells operating only when all the horses are in proper position, and means for delaying the horses in proper position for a predetermined length of time, said means including slow-acting relays mounted in conjunction with the photo-electric cells, and a common source of current supply for the photo-electric cells, relays, and light sources.

6. In a race starting gate, photo-electric cells, relays and latches for automatically releasing the barrier and starting the race upon the presence for a desired time of all the racers in the gate.

7. In a race starting gate, photo-electric cells, relays and latches for automatically releasing the barrier and starting the race upon the presence for a desired time of all the racers in the gate, said means automatically withholding the springing of the barrier in the event of any of the racers moving out of proper starting position during said desired time.

ALBERT J. FIHE.